United States Patent
Hyrenbach

(10) Patent No.: US 10,529,510 B2
(45) Date of Patent: Jan. 7, 2020

(54) GAS INSULATED SWITCHGEAR WITH THE USE OF INSULATING GASES OR FLUIDS, AND METHOD OF PRODUCING THE SAME

(71) Applicant: ABB Schweiz AG, Baden (CH)

(72) Inventor: Maik Hyrenbach, Ratingen (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/867,768

(22) Filed: Jan. 11, 2018

(65) Prior Publication Data
US 2018/0130622 A1 May 10, 2018

Related U.S. Application Data

(63) Continuation of application No. PCT/EP2016/066969, filed on Jul. 15, 2016.

(30) Foreign Application Priority Data

Jul. 17, 2015 (EP) .................................. 15177333

(51) Int. Cl.
*H01H 33/56* (2006.01)
*H01H 11/00* (2006.01)

(52) U.S. Cl.
CPC ............ *H01H 33/56* (2013.01); *H01H 11/00* (2013.01)

(58) Field of Classification Search
CPC .......... H01B 3/56; H01B 3/24; H02B 13/055; H01H 2033/566; H01H 33/22; H01H 33/021; H01H 11/00
USPC ............................. 218/155, 157, 85; 252/571
See application file for complete search history.

(56) References Cited

U.S. PATENT DOCUMENTS

| 4,336,414 | A | * | 6/1982 | Suzuki | H01B 17/36 174/14 R |
| 5,483,031 | A | * | 1/1996 | Matsuda | H01H 1/385 218/48 |
| 8,680,421 | B2 | * | 3/2014 | Hyrenbach | H01B 3/56 218/158 |
| 8,704,095 | B2 | * | 4/2014 | Claessens | H01B 3/56 174/124 R |

(Continued)

FOREIGN PATENT DOCUMENTS

| DE | 202014003243 U1 | 5/2014 |
| EP | 0885841 A1 | 12/1998 |

(Continued)

*Primary Examiner* — Edwin A. Leon
*Assistant Examiner* — William A Bolton
(74) *Attorney, Agent, or Firm* — Leydig, Voit & Mayer, Ltd.

(57) ABSTRACT

In an embodiment, the present invention provides a gas insulated switchgear for medium- or high-voltage use, including: a closed housing of a switchgear compartment having insulating gases or fluids. The insulation gas includes sulfurhexaflouride ($SF_6$). Constructive features of the switchgear are designed such that they are overperformed for the use of sulfurhexaflouride ($SF_6$), but already sufficiently performed for the use of eco efficient insulation gas with a mixture of up to 20% fluoroketone C5F10O and air or oxygen and carbondioxide. A later retrofit or adaption to a switchgear, filled with eco-efficient insulation gas, only needs the aforesaid gas exchange, without exchanging constructive parts of the switchgear.

8 Claims, 3 Drawing Sheets

(56) References Cited

U.S. PATENT DOCUMENTS

| | | | | |
|---|---|---|---|---|
| 8,709,303 B2 * | 4/2014 | Mahdizadeh | ............ | H01B 3/56 |
| | | | | 252/571 |
| 8,822,870 B2 * | 9/2014 | Mantilla | .................. | H01B 3/56 |
| | | | | 218/157 |
| 2012/0280189 A1 * | 11/2012 | Warren | .................... | H01B 3/56 |
| | | | | 252/571 |
| 2014/0233159 A1 * | 8/2014 | Kieffel | ................... | H01H 33/22 |
| | | | | 361/600 |

FOREIGN PATENT DOCUMENTS

| | | | |
|---|---|---|---|
| JP | 2002245905 A | 8/2002 | |
| WO | WO 2011090992 A1 | 7/2011 | |
| WO | WO 2012080246 A1 | 6/2012 | |
| WO | WO 2014154292 A1 | 10/2014 | |

\* cited by examiner

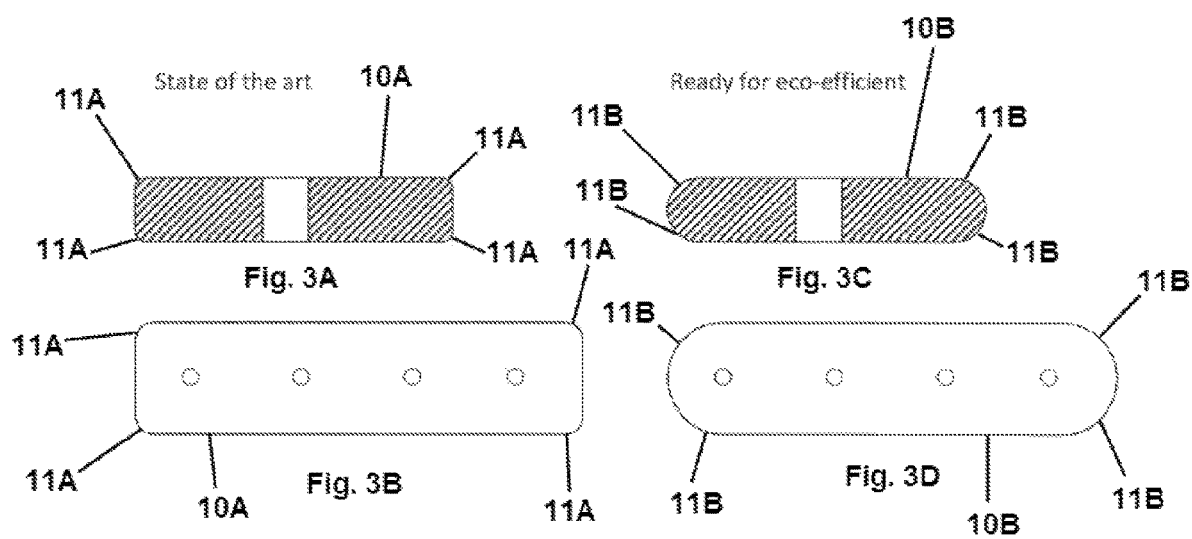

GAS INSULATED SWITCHGEAR WITH THE USE OF INSULATING GASES OR FLUIDS, AND METHOD OF PRODUCING THE SAME

CROSS-REFERENCE TO PRIOR APPLICATION

This application is a continuation of International Patent Application No. PCT/EP2016/066969, filed on Jul. 15, 2016, which claims priority to European Patent Application No. 15177333.0, filed on Jul. 17, 2015. The entire disclosure of both applications is hereby incorporated by reference herein.

FIELD

The invention relates to a Gas insulated switchgear for medium- or high-voltage use, with the use of insulating gases or fluids in a closed housing of a switchgear compartment, wherein the switchgear is using sulfurhexaflouride ($SF_6$) as insulation gas, and method of producing the same.

BACKGROUND

Gas insulated switchgear are used in medium and high voltage applications since about 50 years. The insulation gas widely used in the majority of the applications is $SF_6$, named sulfurhexaflouride. $SF_6$ has the disadvantage of due, having high global warming potential (GWP). According to that, it is under discussion for using other gas mixtures, and first alternative gas mixtures with acceptable dielectric parameters are already available. Such gases are for example mixtures of fluorketones and carrier gases as dry air.

As the dielectric and thermal performance of these new gases are not equivalent to $SF_6$ and materials have to be selected, which are compatible to the new gases, the replacement of the $SF_6$ in an installed gas insulated switchgear by the new gas mixtures is in the state of the art considered as not possible. As long as both solutions are existing in parallel, the customer needs to decide during the ordering, if he wants to buy an $SF_6$ gas insulated switchgear or a new, eco-efficient gas insulated switchgear using an alternative gas mixture.

The decision to buy a $SF_6$ equipment, when an alternative gas insulation is available, is not easy. On one hand, an environmental friendly gas solution is attractive for the customers, but on the other hand $SF_6$ is a proven technology with a long term experience. So the new technology might include technical risks, which are not completely known, as there is only short term and no long term experience.

Some customers even insist on more than 2 years of experience in some reference projects, before using new technology. As gas insulated switchgear are a long term investment for 30 or 40 years, this is binding the customer on the old technology, even with a new attractive technology in reach.

SUMMARY

In an embodiment, the present invention provides a gas insulated switchgear for medium- or high-voltage use, comprising: a closed housing of a switchgear compartment having insulating gases or fluids, wherein the insulation gas comprises sulfurhexaflouride ($SF_6$), wherein constructive features of the switchgear are designed such that they are overperformed for the use of sulfurhexaflouride ($SF_6$), but already sufficiently performed for the use of eco efficient insulation gas with a mixture of up to 20% fluoroketone C5F10O and air or oxygen and carbondioxide, and wherein a later retrofit or adaption to a switchgear, filled with eco-efficient insulation gas, only needs the aforesaid gas exchange, without exchanging constructive parts of the switchgear.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 3A-D show the design of for example the busbar.

DETAILED DESCRIPTION

Figure 1A:
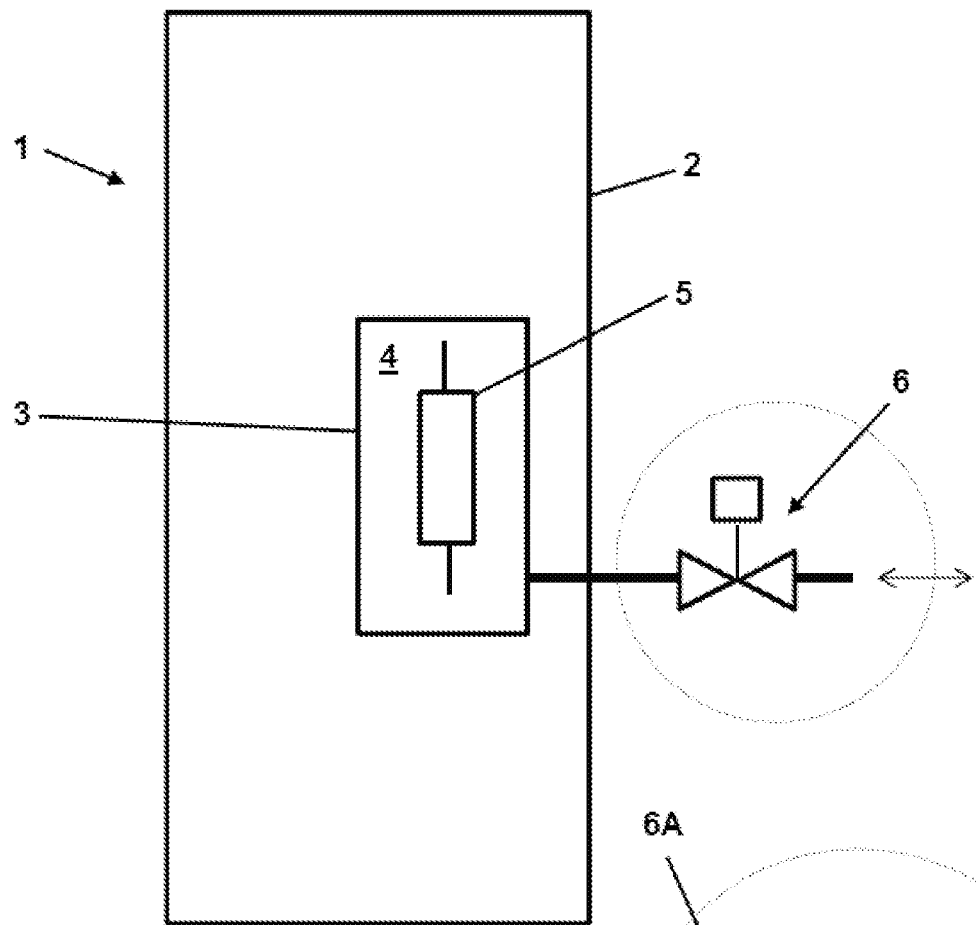
FIG. 1A shows a switchgear arrangement with an external housing and an inner, with insulation gas filled compartment, in which switching elements are arranged, with FIG. 1B showing a detail view of the circle portion in FIG. 1A.

In an embodiment, the present invention provides a switchgear. In an embodiment, the present invention provides a method of producing such a switchgear. In an embodiment, the present invention provides a method of producing a gas insulated switchgear in case of later gas exchange. In an embodiment, the present invention provide the use of several eco-efficient gases for the aforesaid invention.

So in addition to the $SF_6$ gas insulated switchgear and the eco-efficient gas insulated switchgear, a third type of gas insulated switchgear and method of producing the same, occurs by the invention. The "ready for eco efficient gas insulated switchgear" is in principle a gas insulated switchgear regarding to the eco-efficient design, but not using the new insulation gas mixture at the time of delivery, but $SF_6$. For this the following must be applied:

Material compatibility of all materials with new insulation gas mixtures and SF6.

Technical parameters according to the insulation gas with the lower performance, which is the new gas.

Validity of the type tests for all approved gases and gas mixtures to be used later on.

Implementation of modifications required for the new gas-mixtures based on international standards like IEC. The worst case which covers all must be identified and implemented.

This "ready for eco-efficient GIS" will have a higher cost level compared to $SF_6$ GIS, about the same as eco-efficient GIS. But in this case the customer can decide later to switch from $SF_6$ insulation gas to eco-efficient insulation gas.

So the invention is, that the constructive features of the switchgear are designed as such, that they are overperformed for the use of sulfurhexaflouride ($SF_6$), but already sufficiently performed for the use of eco efficient insulation gas with a mixture of up to 20% fluoroketone $C_5F_{10}O$ and air or oxygen and carbondioxide, wherein a later retrofit or adaption to a switchtgear, filled with eco-efficient insulation gas, e.g. using a mixture of fluorketone and air, only needs the aforesaid gas exchange, without exchanging constructive parts of the switchgear.

In a further advantageous embodiment is described, that for the use of eco efficient gases as insulation gases instead of sulfurhexaflouride (SF$_6$), the switchgear is designed in that way, that the lower dielectric performance of the eco efficient insulating gases is compensated by improved dielectric design with rounded edges, gradings or increased distances between conductors and ground potential.

That means functionally, to allow the exchange of the insulation gas by an eco-efficient insulation gas, especially if intended to be done on site at the customer, the design of the encapsulations is prepared to be valid for evacuation, in such, that the deformation must be limited and reversible and the gas tightness must be given even for completely evacuated encapsulations, and that in the gas compartments, which are made of welded steel sheets, are provided with stiffening profiles or sandwich plates and narrow fastening elements at elements or covers sealed using O-rings or other seal elements.

In a further advantageous embodiment, the switchgear is designed and manufactured in that way, that the lower thermal performance of the eco-efficient gas is compensated by improved thermal design as integrated heat sinks, painted surfaces or increased cross sections of conductors and silver plating of all contact areas on the main current path of the switchgear.

In a further advantageous embodiment, it is described, to allow the exchange of the insulation gas by an eco-efficient insulation gas, the deformation of the gas filled compartments are limited and reversible, and gas tightness is given even for completely evacuated encapsulations, in that way, that for a mechanical withstand for a pressure gradient from external to internal, the welded steel sheets of the gas filled compartments are provided with stiffening profiles or sandwich plates and narrow fastening elements at elements or covers sealed using O-rings or other seal elements.

Furthermore it is proposed, that the stiffening elements are arranged on the inner wall of the gas filled, and temporarily evacuated compartments.

In an advantageous embodiment, the encapsulation or at least the gas filled compartments is, or are equipped with a valve, which is designed in that way, that it can be used for removing the actual insulation gas and filling the encapsulation or the compartments with the new eco-efficient insulation gas.

In a further advantageous embodiment, the encapsulation is equipped with a valve, which is designed as a two direction flux valve in that way, that it can be used for removing the actual insulation gas and filling the equipment with the new eco-efficient insulation gas.

By that, the cross-section of the open valve is dimensioned in such, that the evacuation and the filling of the gas filled compartment can be done in an minimized time, and that the valve is provided with self closing means on operating pressures, if the inner pressure of the gas filled compartment is higher than ambient pressure, and when the compartment is evacuated, of about 1 bar below ambient pressure.

Furthermore the switchgear is equipped with a filling valve, which is self closing under operation conditions up to 10.0 bar absolute or 9.0 bar above ambient pressure, and in the evacuated condition at 2 to 5 mbar absolute or about 1 bar below ambient pressure.

In a further advantageous embodiment, the materials themselves or at least a coating, used inside the gas compartment, are selected as being compatible with both gas types, that means the initial insulation gas and the eco-efficient insulation gas.

By that, the materials are aged in the eco-efficient insulation gas. Materials are selected by tests if they have a low impact on the eco-efficient gas, with low decomposition rate, and are not changing their mechanical or electrical performance within acceptable limits.

The switchgear is designed in that way, that it has passed the relevant type tests for both insulation gases. This required that the design is based on the gas with the lower performance, which requires means for better dielectric performance, as field gradings, enlarged radii and thermal performance, as heat sinks, silver plated contacts or gas cooler. The pressure withstand of the encapsulation or the pressure relief ducts is improved by a more robust design, as larger stiffenings, additional fixing points or thicker material.

According to a method of producing such a switchgear, the invention is, that in the manufactural step of producing the gastight compartments, the wall as well as the welding of the wall metal sheets, as well as the sealing are embellished with a mechanical withstand for a pressure gradient from external to internal, in order to be performed ab initio for a later exchange of the insulation gas by an eco-efficient insulation gas, and that the filling of gas into the gas compartment is realized by an evacuation pump, and a valve, through which the insulation gas will be filled into the gas compartment after evacuation via an insulation gas source.

In an further advantageous embodiment, or in case of retrofit gas exchange is described, that gas filled compartments will be evacuated via an in the gasfilled compartment of the switchgear implemented valve by a separate external pump, and that that the vacuum volume will be filled with eco efficient gas or gas mixture, by interconnecting the aforesaid valve with a gas source for eco efficient gas or eco efficient gas mixture, and by steering the filling process by monitoring the pressure inside the aforesaid compartment.

For the use of eco efficient insulation gases to fill medium or high voltage compartments of switchgears in the production of switchgears a priori, or in the insulation gas exchange in retrofit, is proposed gas of the group of fluoroketones and/or fluoronitriles.

Figure 1B:
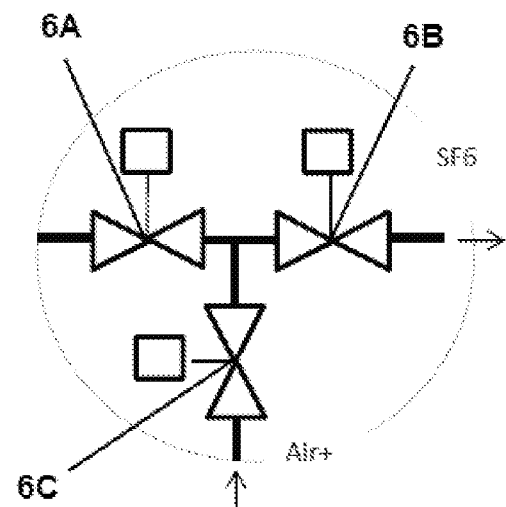
Figures 2A, 2B, 2C, 2D:
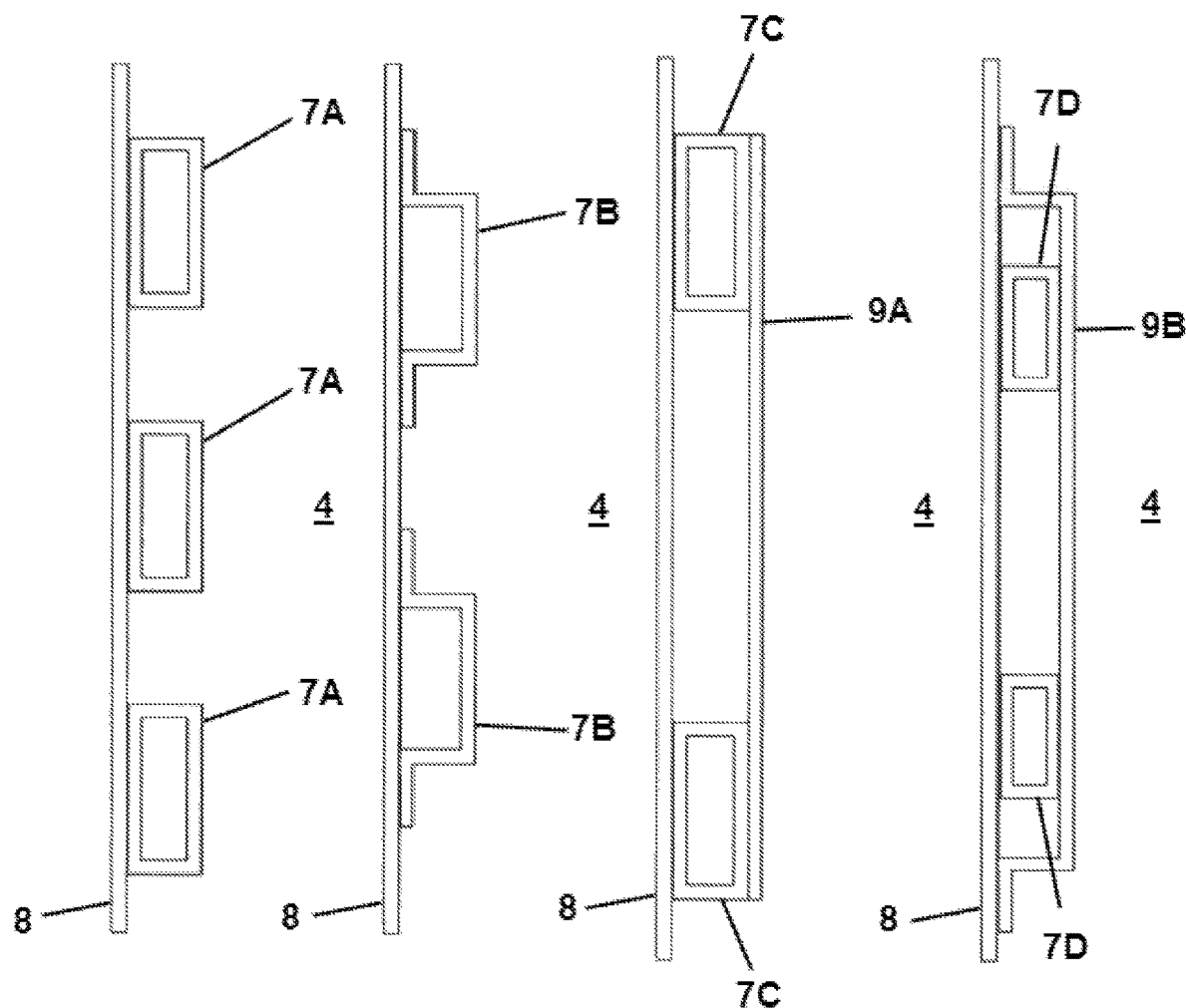
FIGS. 2A-D show several alternatives in the use of stiffening elements.

FIG. 1A shows a switchgear arrangement 1 with an external housing 2 and an inner housing 3, with an insulation gas filled compartment 4, in which switching elements 5 are arranged. Normally the gas filled compartment 4 in so called gas insulated switchgears contains at least busbars and a switch, which might be located in separate gas compartments. A valve arrangement 6 is attached to the gas filled compartment 4 to enable the addition or subtraction of insulation gas to the gas filled compartment. FIG. 1B shows a detail view of the valve arrangement 6, with various valves 6A, 6B, 6C.

Sulfurhexafuoride (SF$_6$) is a normally used insulating gas.

According to the aforesaid high global warming potential (GWP) of SF$_6$, other insulations gases were used with significantly lower global warming potential.

Such insulation gases are available.

So it is the object of the invention, to replace the initial insulation gas by the new insulation gases in for example medium and high voltage switchgears at a later time on site.

Such new insulation gas like fluoroketones or fluoronitriles have to handled in switchgear arrangements.

So for a new fabrication of a switchgear, at least the gasfilled compartment 4 has to be equipped and designed in that way, that normally the filling with SF6 is possible, but the switchgear has to be ready for the uses of the new eco-efficient gases.

FIGS. 2A-D show several alternatives in the use of stiffening elements 7.

Importantly the stiffening elements 7 have to be arranged or fixed in such, that this results in a mechanical withstand from a high pressure inside to a lower pressure outside, and also in the reverse direction.

In case of gas exchange, the concerning compartment 4 has to be evacuated, before filling with the new insulation gas.

For that the compartment 4 has to withstand a pressure gradient from outside environmental pressure, for example round about 1 bar, to inside vacuum.

So the compartment 4 has to be designed in that it considers this pressure gradient, and the compartment 4 has to remain absolutely gastight also at and after this treatment.

In FIG. 2 are shown different wall construction. Each wall construction has environmental pressure from the left side, and the inner room of the compartment 4 is on the right side.

So all stiffening elements 7 are fixed on the wall sheets 8 inside of the compartment 4.

First alternative uses rectangular hollow profiles 7A in closed cross section. Second alternative has rectangular profiles 7B with an Omega cross section. In both alternatives, the stiffening elements 7A, 7B are welded on the wall sheets 8 of the gas filled compartment 4, and are aligned in parallel.

Furthermore a third alternative uses two profiles, welded together, which consist of two parallel rectangular hollow profiles 7C which are welded together with a common sheet 9A. In the fourth alternative the common sheet 9B is extended at the edges in such, that the edges are bended rectangularly in such, that they can be welded to the wall sheet 8.

FIGS. 3A-B show the design of for example the busbar 10. For normally filled SF6 switchgears, the busbars 10A have rectangular cross section (as shown in FIG. 3A) with slightly rounded edges 11A This embodiment is cost effective, for the use of SF6. This is displayed in FIG. 3A (side cross-sectional view) and FIG. 3B (plan view).

FIGS. 3C-D show a busbar 10B with a crosssection geometry for "ready for eco-efficient gas"—use. The busbar crosssection is in this embodiment designed as a flat oval cross section with further rounded edges 11B (as shown in FIG. 3C), in order to improve the dielectric performance for eco-efficient gas use. FIG. 3D shows busbar 10B in plan view.

In the sense of the invention, a SF6 filled switchgear is sufficiently equipped also without predescribed stiffening element 7, and with a rectangular busbar cross section, as shown in FIGS. 3A-B.

But the invention follows the intention that an SF6 filled switchgear could be manufactured today with all features needed for the special use of new eco-efficient insulation gases in the switchgear in the future.

So the switchgear will be adapted at the moment of its fabrication, already to eco-efficient dosing requirements, even in the case, that firstly $SF_6$ will be used.

So, retrofit can be realized only by exchange of gases, and the switchgear design is already adapted to the new insulation gas.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A gas insulated switchgear for medium- or high-voltage use, comprising:
    a closed housing compartment having an insulating gas or fluid, the insulating gas or fluid comprising sulfurhexaflouride (SF6),
    wherein constructive parts of the switchgear are configured for use of sulfurhexaflouride ($SF_6$) as the insulating gas or fluid and also for use of eco efficient insulation gas, with a mixture of up to 20% fluoroketone $C_5F_{10}O$ and air or oxygen and carbon dioxide, as the insulating gas or fluid,
    wherein a later retrofit or adaptation of the gas insulated switchgear to fill the gas insulated switchgear with eco-efficient insulation gas only requires exchanging eco efficient insulation gas for the sulfurhexaflouride ($SF_6$), without exchanging constructive parts of the switchgear,
    wherein the gas insulated switchgear comprises at least one of heat sinks, painted surfaces, or increased cross sections of conductors of the switchgear, and silver plating on all contact areas on a main current path of a switch of the switchgear, and
    wherein, to allow exchange of the insulation gas by the eco-efficient insulation gas, deformation of the closed housing compartment is limited and reversible, and gas tightness is given even for a completely evacuated closed housing compartment, such that for a mechanical withstand for a pressure gradient from external to internal, welded steel sheets of the closed housing compartment are provided with stiffening profiles or sandwich plates.

2. The gas insulated switchgear according to claim 1, wherein, for use of eco efficient gases as the insulating gas or fluid, the gas insulated switchgear comprises rounded edges, gradings, or increased distances between ground potential and conductors within the gas insulated switchgear compared to gas insulated switchgear in which only sulfurhexaflouride (SF6) is used as the insulating gas or fluid.

3. The gas insulated switchgear according to claim 1, wherein the stiffening elements are arranged on an inner wall of the gas filled compartments, which are temporarily evacuated.

4. The gas insulated switchgear according to claim 1, wherein the closed housing compartment is equipped with a valve that is configured be used for removing the insulating gas or fluid and filling the closed housing compartment with the eco-efficient insulation gas.

5. The gas insulated switchgear according to claim 1, wherein the eco-efficient insulation gas comprises a mixture of fluoroketone and air.

6. A method for producing a gas insulated switchgear with insulating gases or fluids in a gastight compartment, comprising:
- in a manufacturing step of producing the gastight compartment, a wall, a welding of wall metal sheets, and a sealing are embellished with a mechanical withstand for a pressure gradient from external to internal, in order to be performed ab initio for a later exchange of the insulating gas by an eco-efficient insulation gas,
- wherein a filling of gas into the gastight compartment is realized by an evacuation pump, and a valve, through which the insulating gas will be filled into the gas compartment after evacuation via an insulating gas source.

7. A gas insulated switchgear for medium- or high-voltage use, comprising:
- a closed housing compartment having an insulating gas or fluid, the insulating gas or fluid comprising sulfurhexaflouride ($SF_6$),
- wherein constructive parts of the switchgear are configured for use of sulfurhexaflouride ($SF_6$) as the insulating gas or fluid and also for use of eco efficient insulation gas, with a mixture of up to 20% fluoroketone $C_5F_{10}O$ and air or oxygen and carbon dioxide, as the insulating gas or fluid,
- wherein a later retrofit or adaptation of the gas insulated switchgear to fill the gas insulated switchgear with eco-efficient insulation gas only requires exchanging eco efficient insulation gas for the sulfurhexaflouride (SF6), without exchanging constructive parts of the switchgear,
- wherein the gas insulated switchgear comprises at least one of heat sinks, painted surfaces, or increased cross sections of conductors of the switchgear, and silver plating on all contact areas on a main current path of a switch of the switchgear,
- wherein the closed housing compartment is equipped with a valve comprising a two direction flux valve such that it can be used for removing the insulating gas or fluid and filling the closed housing compartment with the eco-efficient insulation gas, and
- wherein the valve is provided with a self closing unit configured to close the valve if an inner pressure of the closed housing compartment is higher than ambient pressure, and when the compartment is evacuated, of about 1 bar below ambient pressure.

8. A gas insulated switchgear for medium- or high-voltage use, comprising:
- a closed housing compartment having an insulating gas or fluid, the insulating gas or fluid comprising sulfurhexaflouride ($SF_6$),
- wherein constructive parts of the switchgear are configured for use of sulfurhexaflouride ($SF_6$) as the insulating gas or fluid and also for use of eco efficient insulation gas, with a mixture of up to 20% fluoroketone $C_5F_{10}O$ and air or oxygen and carbon dioxide, as the insulating gas or fluid,
- wherein a later retrofit or adaptation of the gas insulated switchgear to fill the gas insulated switchgear with eco-efficient insulation gas only requires exchanging eco efficient insulation gas for the sulfurhexaflouride ($SF_6$), without exchanging constructive parts of the switchgear,
- wherein the gas insulated switchgear comprises at least one of heat sinks, painted surfaces, or increased cross sections of conductors of the switchgear, and silver plating on all contact areas on a main current path of a switch of the switchgear, and
- wherein the switchgear is equipped with a filling valve, which is self closing under operation conditions up to 10.0 bar absolute or 9.0 bar above ambient pressure, and in an evacuated condition of 50 mbar absolute or below or about 1 bar below ambient pressure.

\* \* \* \* \*